United States Patent
Waldman

(10) Patent No.: US 7,376,592 B2
(45) Date of Patent: May 20, 2008

(54) SYSTEM AND METHOD FOR USING A UNIQUE IDENTIFIER TO INTEGRATE AN OFFLINE EXPERIENCE WITH AN ONLINE EXPERIENCE

(75) Inventor: Julian David Waldman, Hopewell, NJ (US)

(73) Assignees: Sony Corporation (JP); Sony Music Entertainment Inc., New York, NY (US)

( * ) Notice: Subject to any disclaimer, the term of this patent is extended or adjusted under 35 U.S.C. 154(b) by 980 days.

(21) Appl. No.: 10/205,760

(22) Filed: Jul. 26, 2002

(65) Prior Publication Data
US 2004/0019532 A1 Jan. 29, 2004

(51) Int. Cl.
*G06Q 40/00* (2006.01)

(52) U.S. Cl. .............................. 705/26; 705/5; 705/27; 705/39

(58) Field of Classification Search .................... 707/1; 715/517, 530; 705/1, 5, 13, 15, 26, 27, 37, 705/35, 25, 14, 44, 41, 500; 455/405, 406
See application file for complete search history.

(56) References Cited

U.S. PATENT DOCUMENTS

| | | | | |
|---|---|---|---|---|
| 5,367,148 A * | 11/1994 | Storch et al. | ............... | 235/375 |
| 5,548,721 A * | 8/1996 | Denslow | ........................ | 726/9 |
| 5,724,521 A * | 3/1998 | Dedrick | ........................ | 705/26 |
| 5,966,705 A | 10/1999 | Koneru et al. | | |
| 6,178,167 B1 | 1/2001 | Fraser | | |
| 6,240,396 B1 * | 5/2001 | Walker et al. | ................ | 705/26 |
| 6,243,691 B1 * | 6/2001 | Fisher et al. | ................... | 705/37 |
| 6,260,024 B1 * | 7/2001 | Shkedy | ......................... | 705/37 |
| 6,317,718 B1 * | 11/2001 | Fano | .............................. | 705/1 |
| 6,363,389 B1 | 3/2002 | Lyle et al. | | |
| 6,446,045 B1 * | 9/2002 | Stone et al. | ................... | 705/26 |
| 6,601,057 B1 * | 7/2003 | Underwood et al. | ........... | 707/1 |
| 6,799,277 B2 * | 9/2004 | Colvin | ........................ | 726/22 |
| 2002/0169623 A1 * | 11/2002 | Call et al. | ....................... | 705/1 |
| 2002/0183059 A1 * | 12/2002 | Noreen et al. | .............. | 455/427 |
| 2003/0009375 A1 * | 1/2003 | Stoltz et al. | ................... | 705/14 |
| 2003/0163399 A1 * | 8/2003 | Harper et al. | ................. | 705/35 |

(Continued)

OTHER PUBLICATIONS

"Filipinaheart.com" website, active and in operation since Jun. 1997.*

(Continued)

*Primary Examiner*—Hani M. Kazimi
*Assistant Examiner*—Daniel Kesaek
(74) *Attorney, Agent, or Firm*—Lerner, David, Littenberg, Krumholz & Mentlik, LLP

(57) ABSTRACT

A method of using a unique identifier to integrate an offline experience of a user with an online experience of the user. The method includes receiving a unique identifier during a transaction related to the online experience. The method further includes using the unique identifier to obtain at least one of an offline experience identifier and a user identifier, the offline experience identifier being usable to access at least one offline experience data item which is relevant to the offline experience, the user identifier being usable to access at least one user data item which is relevant to the user. The method further includes tailoring the online experience based on at least one offline experience data item and at least one user data item.

58 Claims, 4 Drawing Sheets

U.S. PATENT DOCUMENTS

2003/0188020 A1* 10/2003 Barile ..................... 709/245

OTHER PUBLICATIONS

"Filipinaheart.com" website page from Oct. 23, 2001.*

Lukas, Paul. "Rock for the ages." Money. Mar. 2001. vol. 30, issue 3, pp. 159-161.*

Varga, George. "EMP's MEG Is A-OK." The San Diego Union—Tribune. Jul. 2, 2000. p. E3.*

* cited by examiner

SYSTEM AND METHOD FOR USING A UNIQUE IDENTIFIER TO INTEGRATE AN OFFLINE EXPERIENCE WITH AN ONLINE EXPERIENCE

BACKGROUND OF THE INVENTION

The invention relates generally to tailoring online experiences of Internet users and more particularly to integrating offline experiences of such users with the online experiences.

One of the benefits of the structure and function of distributed networks such as the Internet is the flexibility with which content such as information and opportunities can be presented. Standardized communication protocols, standardized document formats, and the ability to incorporate stored data into Web pages and Web applications, have enabled software developers to construct Web pages and Web sites that are dynamically customized for each visitor. For example, some Web sites currently permit users, during an initial registration process, or during a supplemental registration process, to indicate the type of content the user wishes to experience next time the user visits the Web site. Web sites offering news, for example, may allow the user to indicate whether he or she wishes to view world news, financial news and/or sports news only, as opposed to also receiving local news and business news. Other Web sites, which allow users to purchase goods and/or services, keep track of purchases made by the user, and using such information, suggest additional or alternative purchases to the user when the user subsequently visits the Web site.

A common feature of such tailored online experiences is that the online experience is tailored based on previous online experiences, and/or information provided by the user that is related only generally to offline experiences of the user. These limitations make the current methods unable to accommodate the desires of users for more robust online experiences that are based on specific offline experiences of the user.

Accordingly, there is a need to integrate offline experiences with online experiences, providing more robust content related to specific offline experiences.

Other current methods of tailoring online experiences make it difficult and time-consuming for a user, once having experienced a specific offline experience, to be presented with content directly related to the offline experience. For example, if a user attends a concert by his or her favorite music performer, the user may desire to read more information about the performer, have the opportunity to purchase collectible items that relate to the concert, and/or purchase tickets to future concerts by the same performer. Many companies that host or sponsor offline experiences such as concerts are in the business of offering many different types of offline experiences and/or many different offline experiences of the same type. A user who has attended the concert and wishes to obtain more information or be presented with additional opportunities related to the concert, is able to visit a Web site presented by the company hosting the concert. However, even if the Web site is well organized, the user must typically navigate through many layers of the Web site, often by answering a series of questions or responding to a series of prompts or cues, to arrive at the information or opportunities that the user desires. This process is often time-consuming and discouraging, and sometimes ultimately not fruitful for the user.

For another example, some users experience a media selection as an offline experience, but are unable to identify the title of the media selection. For example, a person hearing a song on the radio for the first time may not know the name of the song or the artist. The user may desire to obtain more information about the media selection or even purchase and download a digital copy of the media selection. Unfortunately, if the user does not know the title of the media selection, she will typically be unable to easily locate these opportunities online. While such a user can navigate to general categories of media selections, she will still need to search through the category manually in order to locate the media selection, often at considerable time expense. In many cases, the user will simply give up after trying for a certain amount of time, and/or attempt to locate the media selection at another competing Web site. While a single incident may not be devastating to an online purveyor of information and content, the cumulative affect of having users leave the Web site dissatisfied, can result in a loss of business. More importantly, online purveyors that can enable users to quickly locate content directly related to specific offline experiences, could achieve a commercial advantage over online purveys that cannot.

Accordingly, there is a need to integrate offline experiences with online experiences, enabling users to quickly and efficiently locate online content directly related to the offline experiences.

In addition, many venues through which the user experiences media selections are not capable of delivering digital copies of media selections to the user conveniently when such digital copies are desired. For example, a user may hear a song on the radio, but the radio is unable to deliver a digital copy of the song to the user. In order to obtain the digital copy, the user must return to a computer having a high-speed access connection to the Internet. If the user is in the car, this wait time can be significant. In addition, the user is required to obtain the title of the song or remember the title until that time, which are difficult tasks if the user is unfamiliar with the song. Web sites offering the downloads typically require users searching the site to know such information, and therefore the user encounters the difficulties discussed above. Further, the user is also required to wait the length of time the download takes once the download has begun. Even with high-speed Internet access modems, the downloading of media selections, depending on the audio or video quality desired, can take too long for many users.

Accordingly, there is a need to integrate offline experiences with online experiences, including online experiences that involve the downloading of digital copies of media selections, enabling users to identify specific offline experiences by providing only circumstantial information about the offline experience. There is also a need to integrate offline experiences with online experiences, making it easier to quickly provide copies of desired media selections to users, once the user has identified the media selections as being related to the user's offline experience.

SUMMARY OF THE INVENTION

In an embodiment, the invention provides a method of using a unique identifier to integrate an offline experience of a user with an online experience of the user. The method includes receiving a unique identifier during a transaction related to the online experience. The method further includes using the unique identifier to obtain at least one of an offline experience identifier and a user identifier, the offline experience identifier being usable to access at least one offline experience data item which is relevant to the offline experience, the user identifier being usable to access at least one user data item which is relevant to the user. The method further includes tailoring the online experience based on at least one offline experience data item and at least one user data item.

In an aspect, the unique identifier includes a combination of the offline experience identifier and the user identifier.

In another aspect, the unique identifier includes at least two separate identifiers.

In yet another aspect, the unique identifier is a numerical result of a mathematical algorithm applied to the offline experience identifier and the user identifier.

In still another aspect, the unique identifier includes at least one of a character string and a bar code.

In still another aspect, the transaction includes at least one of scanning at least a portion of a physical object, the portion being imprinted with the unique identifier, soliciting and accepting manual input of the unique identifier, and accessing the unique identifier from a storage medium.

In still another aspect, the user data item is selected from the group consisting payment information, contact information, demographic information, and preference information. Preferably in this aspect, the demographic data is selected from the group consisting of marital status, income level, occupation, number of children, number of relatives, a biological feature and a biological measurement.

In still another aspect, a tailored portion of the online experience is exclusive to the user.

In still another aspect, the tailoring of the online experience includes at least one of providing a link to a site offering content relevant to at least one of the offline experience and the user, facilitating the purchase of an item relevant to at least one of the offline experience and the user, providing a discount to the user, presenting an advertisement to the user, presenting an opportunity to the user, and digitally transmitting a media selection to the user. Preferably in this aspect, the media selection has been identified by the time at which the user experienced the media selection, the venue through which the user experienced the media selection, and information regarding a presentation order of at least one media selection presented through the venue. Also preferably in this aspect, the user has identified the time and the venue.

In still another aspect, the offline experience is a media selection experienced by the user and the offline experience data item includes at least one of a title of the media selection, a person associated with the media selection, a time at which the media selection was experienced by the user, and a venue through which the media selection was experienced by the user. Preferably in this aspect, the media selection is an audio selection that is heard by the user. Also preferably in this aspect, the media selection is a video selection that is at least one of heard and seen by the user.

In still another aspect, the offline experience is an event experienced by the user and the offline experience data item includes at least one of a name of the event, a person associated with the event, a type of the event, a time of the event, and a place of the event. Preferably in this aspect, the event is at least one of a concert, a show, a presentation, a lecture, and a speech that is attended by the user.

In another embodiment, the invention provides a storage medium containing a software program capable of using a unique identifier to integrate an offline experience of a user with an online experience of the user. The actions can be those discussed above, including those in accordance with one or more of the aspects and preferable characteristics described above.

In yet another embodiment, the invention provides a system including a microprocessor operating under the control of at least one software program capable of causing the system to execute actions in using a unique identifier to integrate an offline experience of a user with an online experience of the user. The actions can be those discussed above, including those in accordance with one or more of the aspects and preferable characteristics described above.

In still another embodiment, the invention provides a system capable of using a unique identifier to integrate an offline experience of a user with an online experience of the user. The system includes means for receiving a unique identifier during a transaction related to the online experience. The system further includes means for using the unique identifier to obtain at least one of an offline experience identifier and a user identifier, the offline experience identifier being usable to access at least one offline experience data item which is relevant to the offline experience, the user identifier being usable to access at least one user data item which is relevant to the user. The system further includes means for tailoring the online experience based on at least one offline experience data item and at least one user data item. One or more of the aspects and preferable characteristics described above can be part of this embodiment as well.

In still another embodiment, the invention provides a method of delivering a file. The method includes receiving from a user an identifier associated with a media selection. The method further includes retrieving a digital media file using the identifier, the digital media file presenting the media selection when played. The method further includes scheduling a digital transfer of the digital media file to a computer. The method further includes transferring the digital media file to the computer via a computer network according to the schedule.

In an aspect, the media selection is selected from the group consisting of an audio selection, an audio selection that is heard by the user, a video selection, a video selection that is heard by the user, and a video selection that is seen by the user.

In another aspect, the computer network includes the Internet.

DETAILED DESCRIPTION

Figure 1:
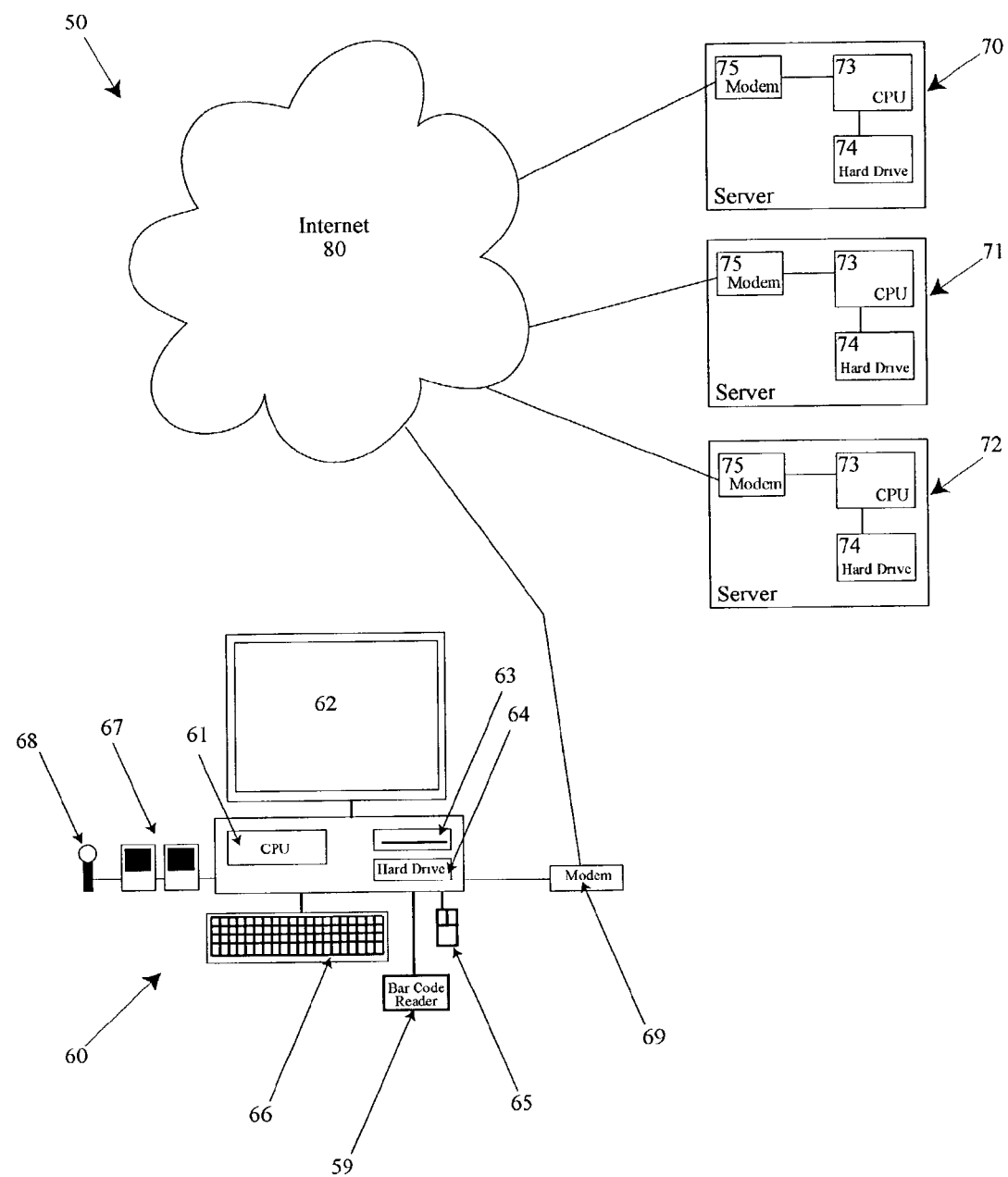
FIG. 1 shows a schematic diagram of an embodiment of a system of the invention.

As shown in FIG. 1, a system 50 in accordance with an embodiment of the invention includes a network of computers such as an end user computer 60 which communicates with Web servers 70-72 via an Internet 80. Although only a few computers are depicted in FIG. 1, it should be appreciated that a typical system can include a large number of connected computers. Preferably, the computer 60 is a general purpose computer having all the components normally found in a computer such as, for example, a central processing unit (CPU) 61, a display 62, a CD-ROM drive 63, a hard drive 64, a mouse 65, a keyboard 66, speakers 67, a microphone 68, a modem 69 and all of the components used for connecting these elements to one another. The computer 60 also has a bar code reader 59 and the components used for connecting the bar code reader 59 as an input device for the end user computer 60. It should be appreciated that other means for inputting information from a human into a computer, in addition to those shown, are also acceptable such as, for example, a touch sensitive screen and a voice recognition system. Further, although the CPU 61 is shown as a single processor, the instructions may be distributed to a number of different components or processors for execution.

The computer 60 can be owned and operated by an end user and communicates with the Internet 80 via the modem 69. The computer 60 may include any device capable of processing instructions and transmitting data to and from humans and other computers, including network computers lacking local storage capability, personal digital assistants (PDAs) with modems, and Internet-capable wireless phones. To provide a specific example to illustrate this embodiment, the computer 60 shall be considered to be owned and operated by an end user who will be referred to throughout this example as a user.

The Web servers 70-72 include hardware for sending and receiving information over the World Wide Web such as, for example, Web pages or files. The hardware includes all of the components normally found in a Web server such as, for example, one or more CPUs 73, one or more hard drives 74, and one or more modems 75. The Web servers 70-72 communicate with the Internet 80 via the modems 75. The Web servers 70-72 may be typical Web servers or any computer network server or other automated system capable of communicating with other computers over a network, including the Internet 80, Wide Area Networks (WANs) or Local Area Networks (LANs). For example, the system described above in connection with the computer 60 may also function as a Web server.

The computer 60 and the Web servers 70-72 each include instructions and a variety of data. Preferably, each of the instructions and data are stored as a program on the respective hard drive of the computer or Web server. The functions, methods and routines of the programs are explained in greater detail below.

The Web server 72 may be owned and operated by a company that is in the business of promoting offline experiences and integrating the offline experiences with online experiences. Exemplary offline experiences promoted by the company include attendance and participation at events such as, for example, concerts, shows, presentations and lectures. Exemplary online experiences include the presentation of Web pages that feature content that is related functionally and/or informationally to the respective offline experience. Such content can include descriptions of products and/or services, such as, for example, products and/or services that are available for sale to the user. Further with regard to the specific example, the company shall be considered to be an entertainment company (the "Company") that is in the business of promoting attendance at concerts and integrating the attendance with online experiences relevant to the concerts.

Figure 2:
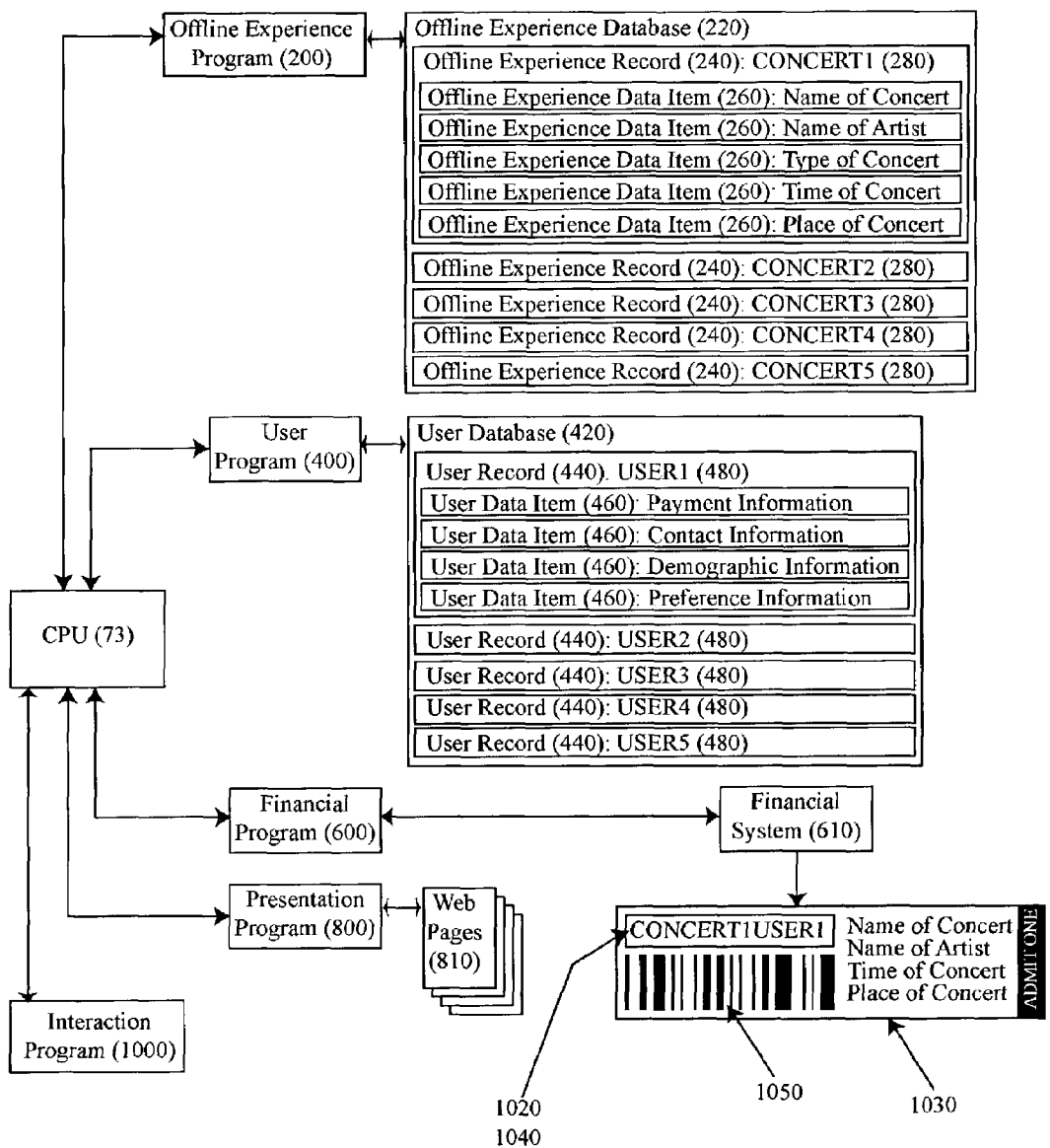
FIG. 2 shows a functional diagram of the embodiment of FIG. 1.

As shown in FIG. 2, to effect the integration, the Web server 72 includes a program 200 that organizes, stores and retrieves offline experience values. The offline experience values include information relevant to the offline experiences and can be used to distinguish each offline experience from other offline experiences being promoted by the Company. Accordingly, as part of the offline experience program 200, the system 50 includes an offline experience database 220 having at least one offline experience record 240. Using the specific example, each of the records 240 corresponds to one of the concerts. Each of the records 240 contains at least one offline experience data item 260, each of which is a data item relevant to the concert for which the associated record is established. The data items 260 in the specific example are: the name of the concert, the artist performing at the concert, the type of concert, the time of the concert and the location of the concert. It should be understood that additional or alternative data items may be stored, depending on the type of offline experience being promoted by the Company, and that the data items used here are merely examples for one type of offline experience.

The system 50 further includes offline experience identifiers 280 that can be used to access each of the records 240 for storage and retrieval of the data items 260. The identifiers 280 in the specific example are concert identifier codes 280: CONCERT1, CONCERT2, CONCERT3, CONCERT4 and CONCERT5. Each code 280 can be used to access its associated record 240 via instructions and processes of the offline experience program 200 in a manner known in the art. It should be understood that any suitable identifier format can be used, and that the format provided here is merely one example.

Further to effect the integration, the Web server 72 includes a program 400 that organizes, stores and retrieves user values. The user values include information relevant to users. Exemplary users include persons who are customers of the Company, that experience the offline experiences and who wish to have their offline experiences integrated with their online experiences. The user values may be collected by any suitable means, but are preferably collected as part of a registration process and/or a transaction process, as described in greater detail below with reference to the operation of the system 50.

Accordingly, as part of the user program 400, the system 50 further includes a user database 420 having at least one user record 440. Each record 440 corresponds to one of the users. Each record 440 contains at least one user data item 460, each of which is a data item relevant to the user for which the associated record is established. The data items 460 in the specific example are the payment information of the user, contact information of the user, demographic information of the user, and preference information of the user. Examples of payment information include credit card numbers, names on credit cards, expiration dates of credit cards, debit card numbers, checking account numbers, and electronic currency account numbers. Examples of contact information include a name, an email address, a physical address, and a telecommunications number. Examples of demographic information include marital status, income level, occupation, number of children, number of relatives, biological features (e.g., hair color, race, ethnic origin, and sex), biological measurements (e.g., age, height and weight), and user characteristics. Examples of preference information include interests, hobbies, types of preferred experiences, types of music the user likes, formats in which the user likes to listen to music, the frequency with which the user tends to purchase music, and the types of music-related products that the user likes to purchase.

It should be understood that additional or alternative data items may be stored, depending on the needs or desires of the Company, and that the data items used here are merely examples for one type of offline experience.

The system 50 further includes user identifiers 480 that can be used to access each of the records 440 for storage and retrieval of the data items 460. The identifiers 480 in the specific example are user account codes 480: USER1, USER2, USER3, USER4 and USER5. Each code 480 can be used to access its associated record 440 via instructions and processes of the user program 400 in a manner known in the art. It should be understood that any suitable identifier format can be used, and the format provided here is merely one example.

Further to effect the integration, the Web server 72 includes a program 600, and a related processing system 610 operating with the program 600, that function together to effect the consummation of financial transactions between users and the Company, particularly in the specific example for the sale of tickets that allow admission to the concerts. The financial program 600 and system 610 in the specific example include all of the components commonly found in programs and systems known in the art that take orders from users over the Internet and deliver printed tickets to the users' physical addresses in return. For example, the financial system 610 can include personnel, transaction machines, ticket printing machines, and communication systems, that can interact with the financial program 600 to achieve this functionality.

Further to effect the integration, the Web server 72 includes a program 800 that dynamically selects and tailors a plurality of Web pages 810 for presentation to users. The Web pages 810 are stored as files on the hard drive 74 of the Web server 72 and contain content directly related to the concerts, including content directly related to those aspects of the concerts identified by the concert data items 260. The content includes preferred information as well as preferred opportunities. For example, informational content can include information about the artists, concert production, and upcoming related concerts. For example, the opportunity content can include opportunities to purchase concert-related merchandise, tickets to upcoming concerts, and recordings of the concert. Such opportunities can includes descriptions of products and/or services that are available for sale to the user. Exemplary products include clothing, audio compact discs, and fan club material. Exemplary services include delivery of news stories, biographical material, and advanced ticket purchase opportunities.

Further to effect the integration, the Web server 72 includes a program 1000 that interacts with users through a Web page interface using the transmission control protocol/ Internet protocol (TCP/IP) and other standard Internet communication protocols. The interaction with users includes receiving data from, and distributing data to, users over the Internet. The interaction program 1000 interacts with the other programs 200, 400, 600 and 800 to coordinate the functions of the programs in response to user input and user needs.

All of the programs 200, 400, 600, 800 and 1000 can, as required, instruct one another and share data between them. This functionality and the functionality of each of the programs individually are directed by the CPU 73 of the Web server 72. The data described in relation to this functionality is stored as required on the hard drive 74 of the Web server 72. Communications with the computer 60 and other nodes of the Internet, including nodes owned and operated by third parties, are accomplished using the modem 75 of the Web server 72. This functionality, storage and communication will be described in greater detail below as the operation of the system 50 is described.

In operation, the system 50 can be used to generate a unique identifier that can be used to integrate an offline experience of a user with an online experience of the user. In the specific example, the offline experience includes an event that the user experiences, specifically a concert that the user attends, and the online experience includes Web pages with which the user interacts, specifically Web pages that present content directly related to the concert.

The process for generating a unique identifier that can be used to integrate the offline experience with the online experience includes establishing the offline experience identifiers 280. As noted above, each of the identifiers 280 can be used to access at least one of the offline experience data items 260 associated with the respective identifier 280.

The process further includes, as part of a transaction related to the offline experience and/or the online experience, collecting at least one of the user data items 460. Suitable transactions include, for example, registration of users and/or purchases by users. In the specific example, the transaction is related to the offline experience in that it is a transaction into which the user enters to gain admission to the concert. In this manner, the transaction facilitates participation of the user in the offline experience. Prior to the transaction, the user selects the concert she desires to attend. The user then operates the computer 60 to connect to a Web page presented by the interaction program 1000 and navigates to a Web page that, in operation with the financial program 600, enables the user to place an order for a ticket to the desired concert. The interaction program 1000 solicits and receives from the user payment information, including a credit card number, the name on the credit card, and the expiration date of the credit card. In this manner, the interaction program 1000, in operation with the financial program 600, collects several user data items 460. These particular user data items 460 are relevant to the user in that they provide information about the user that the Company can use to secure payment for the ticket. It should be understood that additional or alternate payment information can be used, such as, for example, other account numbers, debit card numbers, check numbers, and electronic or digital currency numbers. Once the payment information is received, the information is provided to the financial program 600 for processing in accordance with financial transaction processing known in the art, including debiting the credit card and crediting an account owned by the Company.

As part of the transaction, the interaction program 1000 may also ask the user for user data items that are not necessary to complete the transaction, but which may be helpful to the Company for marketing or other purposes. Such user data items can include the contact information, demographic information, and preference information identified above. In the specific example, the interaction program asks the user for a physical address, the user's age group, the user's occupation, and the type of music to which the user prefers to listen. It should be understood that the information does not need to be related to the offline experience, but can relate to other goods and services of the Company, or goods and services of other companies. In some cases, when the Company has affiliations or relationships with other companies, it is helpful to collect user data items for those other companies, and the collection of user data items, and in particular preferences of the user, can facilitate such activity and enhance such relationships.

It should be noted that in some instances, user data items can be inferred based on a characteristic of the offline experience, a characteristic of the user, and/or a characteristic of the transaction. Regarding a characteristic of the offline experience, for example, if the concert is a pop music concert, the interaction program 1000 (having access to such information via the offline experience program 200) can infer that the user likes pop music. Regarding a characteristic of the user, for example, if the purchase of the ticket is made in person, a representative of the Company can observe, and therefore with certainty infer, that the user is a female with brown hair, and input this information directly into the user record during or after the transaction. Regarding a characteristic of the transaction, for example, if the purchase is made with a credit card that awards airline miles for purchases, the interaction program 1000 can infer that the user likes to travel. It should be understood that other user data item inferences are possible, by combining and/or analyzing user data items obtained during a current transaction with user data items contained in the user's user record, or other users' user records, to establish or realize trends, for example, in users' preference data, demographic data, and or purchasing habits. In this manner, the interaction program 1000, in operation with the user program 400, is able to update the user records as a result of each interaction with the user, to make the online experiences more robust.

As noted above, the collected user data items 460 are stored in the user's user record 440 by the user program 400 after the user program 400 receives them from the interaction program 1000. It should be understood that if a user record does not yet exist for the user, the user program 400 creates a new user record for the user and stores the user data items in the new user record.

The process for generating a unique identifier that can be used to integrate the offline experience with the online experience further includes establishing the user identifiers 480. Each of the identifiers 480 can be used to access at least one of the user data items 460 associated with the respective identifier 480. In the illustrative example, the user identifiers are user account codes 480. That is, as a result of the transaction in the specific example, the user program 400 creates a user record 440, stores the user data items 460 in the user's user record 440, and create a new user account code 480 for the user. This user account code 480 can be used by the user program 400 later to retrieve the user data items 460.

It should be noted that the collection of user data items is not limited to the solicitation and receipt of user data items at the time of the transaction. If the user program 400 has previously stored user data items, the collection of user data items can include accessing and retrieving a stored user data item. In this example, if the user program 400 has previously stored user data items in the user's user record, for example, during a prior transaction, the user can provide the user's user account code 480, and the user program 400 can retrieve previously stored user data items by accessing the user's user record using the user's user account code 480. For another example, if the Company has collected user data items in connection with another interaction between the Company and the user, and has stored those data items in the user database 420 or another database, the user data items can be accessed and retrieved as part of the collection of user data items during the current transaction.

The process for generating a unique identifier that can be used to integrate the offline experience with the online experience further includes using the offline experience identifier and/or the user identifier to establish a unique identifier, such that the unique identifier can be subsequently used to obtain the offline experience identifier and/or the user identifier. In the specific example, the interaction program 1000 accesses the offline experience identifier 280 corresponding to the concert which the user will be attending, and the user account code 480, and combines them sequentially to establish a unique identifier 1020. The first part of the unique identifier 1020 reflects the concert identifier code 280 and the second part of the unique identifier 1020 reflects the user account code 480. Other methods of establishing a unique identifier using the offline experience identifier and the user identifier can be employed. For example, the unique identifier can be a numerical result of a mathematical algorithm applied to the offline experience identifier and the user identifier. Or, for example, the unique identifier may include two separate identifiers that are issued to the user separately, such that both must be supplied by the user to function as a unique identifier.

As part of the transaction in this embodiment, the interaction program 1000 provides the unique identifier 1020 to the financial program 600, which in turn provides the unique identifier 1020 to the financial system 610. The financial system 610 in the specific example generates a printed ticket 1030 that includes not only information typically found on an admission ticket, but also the unique identifier 1020 in a character string form 1040 and in a bar code form 1050. The financial system 610 then mails the ticket 1040 to the physical address provided by the user.

The use of a bar code form has certain advantages in that the bar code can efficiently be read by a bar code reader, and cannot easily be read or communicated by the user or another person. This prevents the unique identifier from being easily transferred for use by someone other than the user. This is preferable, because the unique identifier bestows certain benefits when it is used, as will be described in greater detail below. It should be understood that the unique identifier, whether or not in bar code form, can be imprinted on other physical objects such as, for example, cards, electronic items, and parts of the user.

It should be understood, however, that the unique identifier can be presented in any suitable form. In some cases, a form that can easily be read and communicated by the user has certain advantages. For example, if the unique identifier is a character string or a uniform resource locator (URL) address, the user can input the unique identifier manually using a keyboard, keypad, stylus, voice recognition system, or other input device. This is preferable when the use of a bar code reader or other machine reader is not practical or efficient. When the transaction is performed over a digital communications network, such as the Internet, the unique identifier can be transmitted digitally to the user, and may not necessarily be imprinted on a physical object. For example, if the user registers for attendance at a concert using her credit card, and the Company, instead of issuing a physical ticket to the user, requires only that the user swipe her credit card at the admissions gate to confirm with the Company's database that she has pre-paid to attend the concert, the Company could issue the unique identifier to the user digitally at the time of the registration transaction, and the user could use the unique identifier during a subsequent online experience. It should be understood that many digital forms can be used, including, for example, character strings, digital certificates, and digital signatures. It should also be understood that more than one form can be used. The use of more than one form allows the use of the unique identifier to be more versatile. For example, in this embodiment both a bar code and a character string are used. This enables the user to easily communicate the unique identifier manually, and also enables the unique identifier to be efficiently read by a machine, such as the bar code reader 59 as will be described below.

It should be further understood that, depending on how the unique identifier will be used, the unique identifier can be stored on a storage medium for later retrieval. The storage medium can be, for example, a hard drive 74 of the Web server 72, a hard drive 664 of the computer 60, or any other suitable storage medium.

The system 50 further provides for using the unique identifier to integrate the offline experience with the online experience. As will be described in greater detail below, the integration involves tailoring the online experience using an offline experience data item and/or a user data item.

The process for using the unique identifier to integrate the offline experience with the online experience includes receiving the unique identifier during a transaction related to the online experience. In the specific example, this transaction takes place after the user has attended the concert. However, it should be understood that the transaction can take place at any time after the user has received the unique identifier 1020. In the specific example, after the user has attended the concert, the user desires to obtain more information and be presented with additional opportunities relevant to the concert. Therefore, she uses the computer 60 to navigate to the Company's Web site to interact with the interaction program 1000. During a transaction on the Web site, the interaction program 1000 solicits the user's unique identifier 1020. In response, in the specific example, the user allows the bar code form 1050 of the unique identifier 1020 to be scanned by the bar code reader 59, and instructs the computer 60 to transmit a digital form of the unique identifier 1020 to the interaction program 1000. Alternatively, the user can manually input the character string form 1040 of the unique identifier 1020, using the keyboard 66 or any other input device.

It should also be noted that in other embodiments, the interaction program 1000 can access the unique identifier 1020 from a storage medium such as the Web server's hard drive 74. For example, if the user has previously provided the unique identifier 1020 to the interaction program 1000, and has given permission for the identifier 1020 to be stored on the hard drive 74 and automatically retrieved when the user visits the Web site, the interaction program 1000 can receive the unique identifier 1020 during the transaction by retrieving the unique identifier 1020 from the hard drive 74. The use of "cookies" or similar files residing on a storage medium of the user's computer 60 can also be used to store the unique identifier 1020, and the interaction program 1000 can access the "cookie" when the user navigates to the Web site, to obtain the unique identifier 1020. This prevents the user from being required to manually provide the unique identifier 1020 during repeated attempts to use it.

The process for using the unique identifier to integrate the offline experience with the online experience further includes using the unique identifier to obtain the offline experience identifier and/or the user identifier. As noted above, the offline experience identifier can be used to access at least one offline experience data item, and the user identifier can be used to access at least one user data item. In the specific example, the interaction program 1000, in operation with the offline experience program 200 and the user program 400, interprets the unique identifier 1020 received from the user to obtain the concert identifier code 280 and the user account code 480. This can be accomplished by any suitable means such as, for example, reversing the process by which the unique identifier 1020 was established. For example, if the unique identifier is a numerical result of a mathematical algorithm applied to the offline experience identifier and the user identifier, an application of a reverse algorithm could reveal the separate identifiers. In embodiments such as the specific example, when the unique identifier is a combination of the offline experience identifier and the user identifier, a separation of the unique identifier, for example, using known character string lengths of each identifier, can reveal the separate identifiers. In other embodiments, the unique identifier includes two separate identifiers that are issued to the user separately. For example, if the user obtains an offline experience identifier separately from a user account code, but both the offline experience identifier and the user account code together function as a unique identifier, the user may be required, when asked to provide the unique identifier, to separately provide both the offline experience identifier and the user account code, in order to have the online experience tailored. In such embodiments, the interpretation of the unique identifier is a straightforward recognition of the two separate identifiers.

Once the interaction program 1000 has interpreted the unique identifier 1020 to obtain the offline experience identifier 280 and/or the user identifier 480, the interaction program 1000, in operation with the offline experience program 200 and the user program 400, is able to access the offline experience data items 260 and/or user data items 460.

The process for using the unique identifier to integrate the offline experience with the online experience further includes tailoring the online experience based on the offline experience data item and/or at least one user data item. In the specific example, once the concert data items 260 and the user data items 460 are available to the interaction program 1000, the interaction program 1000 can, in operation with the presentation program 800, use these items to tailor the online experience to make it more useful or enjoyable to the user. In some embodiments, the user would be permitted to purchase preferred merchandise or view preferred information related to the offline experience and/or the user's interests, opportunities with which the user would not be presented if she had not provided the unique identifier. In some embodiments, the tailored portion of the online experience is exclusive to the user in that, for example, the tailored portion cannot be accessed by other users and/or provides content or opportunities not afforded to other users.

In the specific example, the interaction program 1000 presents a Web page to the user that provides a link to a Web site or Web page offering content relevant to the concert and/or the user. Once the interaction program 1000 has obtained the concert identifier code 280, the interaction program 1000, in operation with the offline experience program 200, accesses the concert record 240 in the offline experience database 220 to determine who performed at the concert. The interaction program 1000, in operation with the presentation program 800, then presents a Web page to the user that allows the user to view biographical information about the performer, or to enter a chat room featuring the performer. Once the interaction program 1000 has obtained the user account code 480, the interaction program 1000, in operation with the user program 400, accesses the user's user record 440 in the user database 420 to determine if the user works in the entertainment industry. The interaction program 1000, in operation with the presentation program 800, then presents a Web page to the user that allows the user to view non-public statistical information about the financial ramifications of the concert.

Or, for another example, the interaction program 1000, in operation with the financial program 600, would facilitate the purchase of an item relevant to the offline experience and/or the user. If the concert record 240 indicates that the performing group will perform at another concert later in the year, the interaction program 1000 can present a Web page to the user that allows the user to purchase advanced or preferred tickets using the financial program 600. If the user record 440 indicates that the user prefers outdoor activities, the interaction program 1000 could present a Web page that sells outdoor gear imprinted with the performing group's logo, or a Web page that highlights all of the outdoor events at which the group is schedule to perform. The Company can also offer discounts to the user toward purchases.

Or, for another example, the interaction program 1000 would present an advertisement or opportunity to the user. If the concert record 240 indicates that the concert involved rock music, the interaction program 1000 can present a Web page that advertises media selections that include rock music. If the user record 440 indicates that the user is a musician, the interaction program 1000 can present a Web page that offers free advanced music instruction classes at a discounted price.

It should be noted that the first transaction discussed above, in which the user data items are collected, can be related to the online experience rather than, or in addition to, the offline experience. For example, in embodiments where the offline experience identifier, but not the user identifier, is used to establish the unique identifier, the online experience can still be tailored based on a user data item. This would be useful if the Company desires to first provide the unique identifier, and then collect a user data item during a subsequent online transaction. For example, the Company may distribute unique identifiers during an offline experience such as, for example, a promotional event (e.g., a free concert or marketing presentation). An offline experience identifier could be established for the promotional event, and offline experience data items relevant to the promotional event can be stored in an offline experience record in an offline experience database. The unique identifiers could be established using that offline experience identifier and, for example, sequential numbers. Each unique identifier could be imprinted on, for example, promotional cards that are handed out during the promotional event. Or, for example, each unique identifier could be stamped onto each user's hand.

Later, each user could visit the Company's Web site and in an online transaction, provide her unique identifier to the interaction program 1000 upon request. It should be understood that the provision of the unique identifier can be accomplished by any suitable method, including the methods described above. For example, if the unique identifier has been imprinted on the promotional card in the form of a bar code, the user may provide the unique identifier to the interaction program 1000 by using a bar code reader to scan that portion of the promotional card imprinted with the bar code.

This type of transaction facilitates participation in the online experience. The unique identifier can be interpreted and used by the interaction program 1000 to obtain the offline experience identifier 280. The interaction program 1000, in operation with the offline experience program 200, can then use the offline experience identifier 280 to access offline experience data items 260, relevant to the promotional event, that have been stored in the associated offline experience record 240. The interaction program 1000 can then use these offline experience data items 260 to tailor the online experience accordingly.

However, also during this transaction, the interaction program 1000 may solicit and receive one or more user data items 460 from the user, establish a user record 440 for the user, and store the user data items 460 in the user record 440. In some cases, if the interaction program 1000 has already previously established a user record 440 for the user, for example, based on a previous transaction between the user and the Company, and in that transaction has collected user data items 460, the collection of user data items 460 during this current transaction can involve accessing those user data items 460 in the user's user record 440. Any new or changed user data items 460 can be added to or updated in the user's user record 440. The user data items 460 can then be used to tailor the user's online experience.

Also during this transaction, user data items may be inferred, as noted above, and user data items based on a characteristic of the online experience may also be inferred. For example, if the user accesses the Company's Web site using a Windows™-based personal computer, the interaction program 1000 can infer that Windows™ is the operating system platform preferred by the user.

It should be understood that while in this alternate example the unique identifier was established using the offline experience identifier 280 and not a user identifier 480, certain embodiments of the invention could use unique identifiers that are established using user identifiers 480 and not offline experience identifiers 280. In such embodiments, then, the offline experience identifiers 280 can be provided later during an online transaction, and the online experience can be tailored accordingly, similar to the manner described above. For example, a user could purchase a subscription to online content presented by the interaction program 1000, and in return receive a unique identifier. Later, during an online transaction, the user can be prompted to provide an offline experience data item (e.g., the name of an event or the name of a media selection) to the interaction program 1000, and the interaction program 1000 can tailor the online experience accordingly.

Figure 3:
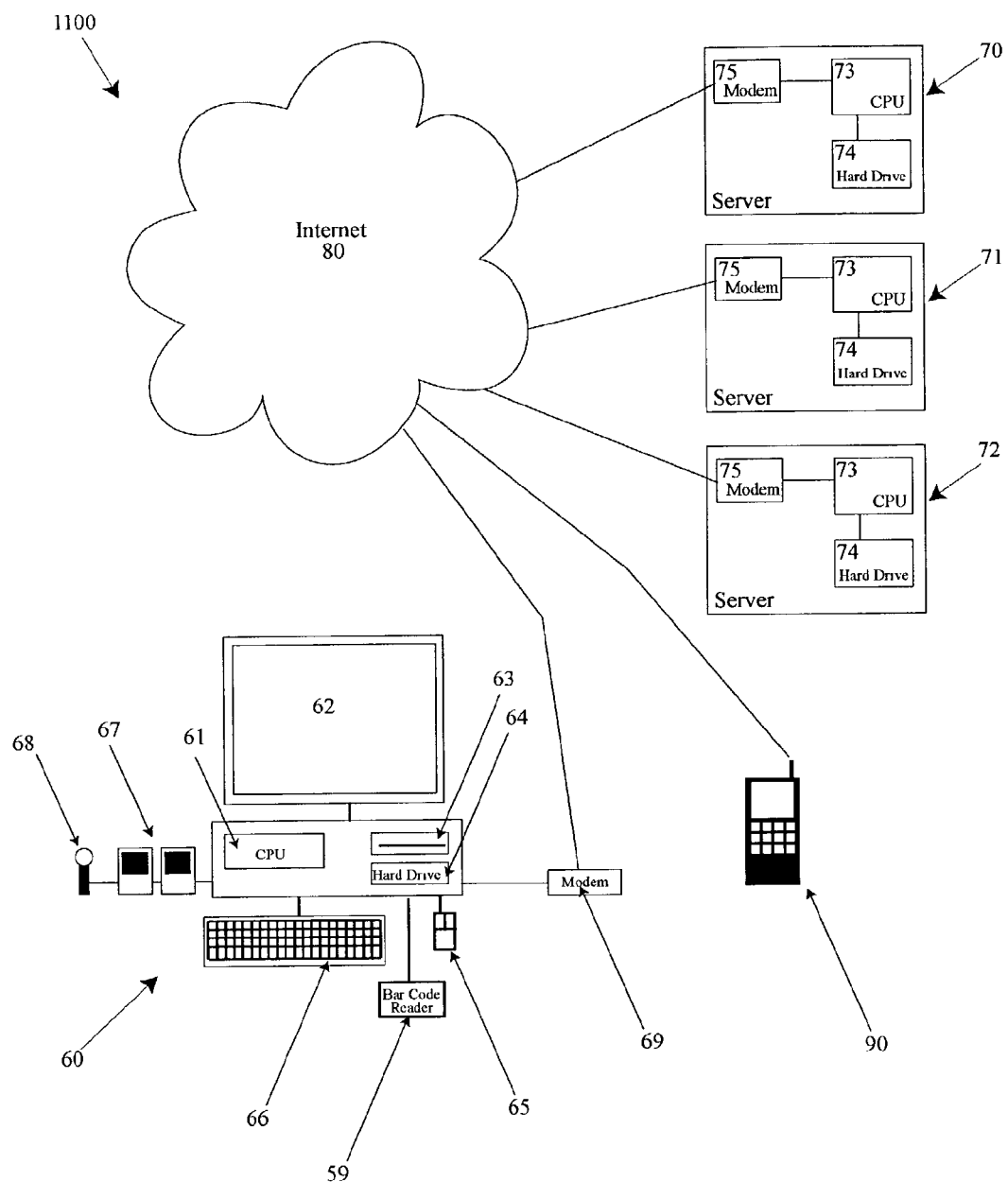
FIG. 3 shows a schematic diagram of another embodiment of a system of the invention.
Figure 4:
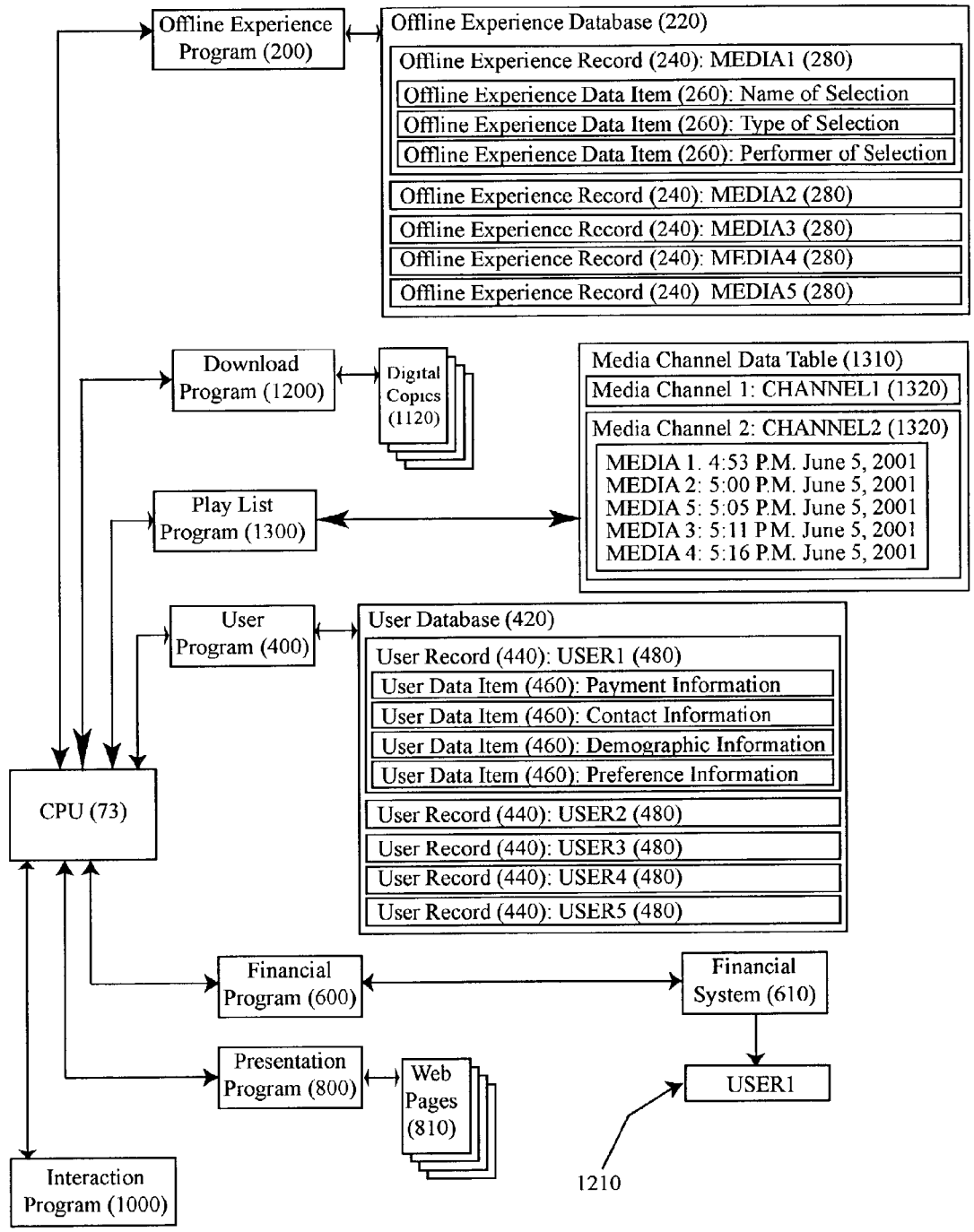
FIG. 4 shows a functional diagram of the embodiment of FIG. 3.

Referring now to FIGS. 3 and 4, in another embodiment a system 1100 is similar in structure and function to the system 50 of the first embodiment, with certain exceptions.

First, the user has a mobile phone 90 that can be used to access the Internet 80 wirelessly and that the user can use to send and receive information to and from the Web server 72 and other nodes of the Internet 80.

Second, to provide a second specific example to illustrate this embodiment, the Company shall be considered to further be in the business of broadcasting media selections over two media channels, and have a current broadcast base of several media selections. The offline experience database 220 in this embodiment has at least one offline experience record 240. Using the second specific example, each of the records 240 corresponds to one of the media selections. Each of the records 240 contains at least one offline experience data item 260, each of which is a data item relevant to the media selection for which the associated record is established. The data items 260 in the second specific example are: the name of the media selection, the type of the media selection, and the performer of the media selection. Again, it should be understood that additional or alternative data items may be stored, depending on the type of offline experience being promoted by the Company, and that the data items used here are merely examples for one type of offline experience.

Further, the offline experience identifiers 280 in the second specific example are media selection identifier codes 280: MEDIA1, MEDIA2, MEDIA3, MEDIA4 AND MEDIA5. Each code 280 can be used to access its associated record 240 via instructions and processes of the offline experience program 200 in a manner known in the art. It should be understood that any suitable identifier format can be used, and the format provided here is merely one example.

Third, the Web server 72 further includes on the hard drive 74 digital copies 1120 of the media selections, and a program 1200 that if provided with a media selection identifier 280, can access the associated digital copy 1120 and effect a download of the digital copy 1120 to the computer 60 through the Internet 80. It should be understood that in other embodiments, the digital copies 1120 can reside on other servers or storage mediums, remote from or proximal to the Web server 72, and be accessible to the Web server 72 to enable the same functionality as described.

The digital copy 1120 can be, for example, a digital media file that when played presents the associated media selection. For example, the digital copy 1120 can be a .wav file that can be played by a media player application, such as, for example, Windows™ Media Players™, that executes on the computer 60. It should be understood that the term "download" as used herein encompasses any method of transfer, including digital transfers of a type known in the art.

Fourth, the Web server 72 further includes a program 1300 that maintains a data table 1310 that includes current play list data for the two media channels. In the second specific example, each media channel, identified with media channel identifiers 1320: CHANNEL1 and CHANNEL2, respectively, play the media selections at the times indicated in the data table 1310.

All other components of the system 1100 are labeled in accordance with the labeling of the system 50 of the first embodiment, to indicate identical functionality.

In operation, the system 1100 can be used to generate a unique identifier that can be used to integrate an offline experience of a user with an online experience of the user. In the second specific example, the offline experience includes a media selection that the user experiences, specifically an audio selection that the user hears on an analog radio station. It should be noted that other media selections may include, for example, a video selection that is heard and/or seen by the user, and may include live media selections or recorded media selections. The online experience includes the downloading of a digital copy of the song.

As noted above, the process for generating a unique identifier that can be used to integrate the offline experience with the online experience includes establishing the offline experience identifiers 280. Each of the identifiers 280 can be used to access at least one of the offline experience data items 260 associated with the respective identifier 280.

The process further includes, as part of a transaction related to at least one of the offline experience and the online experience, collecting at least one of the user data items 460. In the second specific example, the transaction is related to the offline experience in that it is a transaction into which the user enters to be able to hear the song. In this manner, the transaction facilitates participation of the user in the offline experience. In the second specific example, the transaction is a transaction for subscribing for access to media channels on which the media selections are broadcast. For another example, the transaction can be a transaction for subscribing for access to a media collection containing the media selections. Such transactions can be similar to the transaction described above for purchasing admission to an event. Prior to the transaction in this second illustrative example, the user determines the media channel to which she desires to listen. The user then operates the computer 60 to connect to a Web page presented by the interaction program 1000 and navigates to a Web page that, in operation with the financial program 600, enables the user to place an order for a subscription to one of the media channels. The interaction program 1000 solicits and receives from the user payment information, including a credit card number, the name on the credit card, and the expiration date of the credit card. In this manner, the interaction program 1000, in operation with the financial program 600, collects several user data items 460. These particular user data items 460 are relevant to the user in that they provide information about the user that the Company can use to secure payment for the subscription. It should be understood that additional or alternate payment information can be used, such as, for example, account numbers, debit card numbers, check numbers, and electronic or digital currency numbers. Once the payment information is received, the information is provided to the financial program 600 for processing in accordance with financial transaction processing known in the art, including debiting the credit card and crediting an account owned by the Company.

As part of the transaction, the interaction program 1000 may also ask the user for user data items that are not necessary to complete the transaction, but which may be helpful to the Company for marketing or other purposes. Such user data items include, in the second specific example, the user data items listed above in the related discussion regarding the first embodiment. It should be understood that user data items can therefore be collected in the manners described above and in other manners, and be stored in a user record 440 for the user in the user database 420 maintained by the Web server 72.

The process for generating a unique identifier that can be used to integrate the offline experience with the online experience further includes establishing the user identifiers 480. Each of the identifiers 480 can be used to access at least one of the user data items 460 associated with the respective identifier 480. In the second specific example, the user identifiers are user account codes 480. That is, as a result of the transaction in the second specific example, the user program 400 creates a user record 440, stores the user data items 460 in the user's user record 440, and create a new user account code 480 for the user. This user account code 480 can be used by the user program 400 later to retrieve the user data items 460.

The process for generating a unique identifier that can be used to integrate the offline experience with the online experience further includes using the offline experience identifier and/or the user identifier to establish the unique identifier, such that the unique identifier can be subsequently used to obtain the offline experience identifier and/or the user identifier. In the second specific example, the interaction program 1000 accesses the user account code 480 and uses it to establish a unique identifier 1210 that is a character string. It should be understood that the unique identifier can be established in many ways, and could take on other forms, including the ways and forms discussed above in the related discussion regarding the first illustrated embodiment. The use of forms that are printed on physical objects and/or that cannot easily be read or communicated by the user, but which can easily be read by a machine, have certain advantages. Those forms provide greater control by the Company as to which users can gain access to tailored online experiences through the use of the unique identifier, and provide greater accuracy of user data items that are collected.

As part of the transaction in this embodiment, the interaction program 1000 provides the unique identifier 1210 to the financial program 600, which in turn provides the unique identifier 1210 to the financial system 610. The financial system 610 in the second specific example generates a digital form of the unique identifier 1210 and transmits the unique identifier 1210 in digital form to the user, for example, through email or another electronic delivery medium. Because the unique identifier 1210 is a character string, it can easily be read and communicated by the user. Therefore, the user can, when asked by the interaction program 1000 or other programs, provide the character string manually using a keyboard, keypad, stylus, voice recognition system, or other input device. This is preferable when the use of a bar code reader or other machine reader is not practical or efficient, for example, when it is preferable that the unique identifier be supplied by a variety of input devices, especially mobile devices with limited input features, and including the mobile phone 90 shown in FIG. 3.

The system 1100 further provides for using the unique identifier to integrate the offline experience with the online experience. The process for using the unique identifier to integrate the offline experience with the online experience includes receiving the unique identifier during a transaction related to the online experience. In this embodiment, the solicitation, provision and use of the unique identifier 1210 can be accomplished in the same manners described above in the related discussions with regard to the first embodiment, including navigating to a Web site hosted by the Company, providing the unique identifier 1210, and thereafter being presented with tailored Web pages and other tailored online experiences.

The manner in which media selections are typically broadcast or distributed presents certain additional and/or alternative opportunities for the tailoring of the online experience. For example, many events take place at times and through venues that are established and known to the user prior to the event. This allows the user to participate in the event knowing in advance the probable content of the event. By contrast, many media selections are broadcast or distributed without warning to the user. For example, the user will hear a song on the radio while driving in her car, without foreknowledge that the song was going to be played. Or, for example, the user will see and hear a video while viewing and listening to television, without foreknowledge that the video was going to be broadcast. Or, for example, the user may attend an event knowing that a certain artist is scheduled to perform, but not knowing exactly what songs will be performed. During the event, the user may hear a song that the user did not expect to hear, or see a visual presentation that the user did not expect to see. The user is typically unaware of the title of the media selection that has been experienced, and therefore is unable to identify the media selection to the Company so that the Company can tailor the online experience in the manners described above. Nevertheless, the user may still be interested in obtaining more information about the media selection, and/or purchasing and/or obtaining a copy of the media selection. The invention provides a process by which additional information about the media selection can be collected such as, for example, the time at which the user experiences a media selection and/or the venue through which the user experiences the media selection. Such additional information can then be used individually and/or collectively as offline experience identifiers, and can therefore be used to tailor the online experience.

Accordingly, another process for using the unique identifier to integrate the offline experience with the online experience is presented in this embodiment. As noted above, in the second specific example, the user has already engaged in a transaction to subscribe to a media channel, and therefore has been issued a unique identifier 1210. It should be noted that in addition to media channels, the described embodiment can be adapted to accomplish the same functionality if the user has, for example, purchased a subscription to a media collection owned by the Company, or admission to an event where media selections are, for example, performed live. Here in the second specific example, the user has provided payment information as described above, and in exchange, is permitted to listen to the media channel.

As the user listens to the media channel, the user experiences a media selection, and desires to purchase and take delivery of a copy of the media selection. However, the user does not know any information about the media selection other than the time at which she experienced it (e.g., 5:00 P.M. on June $5^{th}$) and the venue through which she experienced it (e.g., MTV™ cable station, WPLJ™ radio station, or a specific concert). In order to identify the media selection to the interaction program 1000, this time and venue information can be provided to the interaction program 1000 manually by the user. In some embodiments, it can be provided to the interaction program 1000 automatically by a media player.

In the second specific example, the user manually provides the time and venue information using the mobile phone 90. It should be understood that any other suitable wireless communications device can also be used, such as, for example, a PDA that is capable of communicating using the Internet and/or otherwise establishing a communication link to the interaction program 1000. The Company's Web site in the second specific example can be accessed by the user's mobile phone 90 so that the user can conveniently provide the time and venue information. It should be noted that in other embodiments, the user could provide the information manually using other communications devices, including wired telecommunications devices such as land-based telephones (e.g., using voice commands or instructions or using the keypad tones) and desktop computers.

Automatic provision of the time and venue information can be achieved through the use of media players that are adapted to have such a feature. For example, certain media players such as, for example, digital media players, are aware of which media channel is currently being monitored by the media player, and are aware of the current time. Also for example, certain digital media players are aware that the media player is currently set to the Pop channel, and that the current time of day is 4:30 P.M. Such media players could be further adapted to have a selection button that when activated, establishes a communications link to, and digitally transmits the time and channel information to, the interaction program 1000.

In the second specific example, as the user is listening to an analog radio station (the channel to which she subscribed), she hears a song that she likes, but with which she is unfamiliar. She decides that she would like to purchase and download a digital copy of the song. It should be noted that forms of delivery other than digital download can be requested by the user and employed by the Company such as, for example, the delivery of a copy of the song on a recording medium such as, for example, a compact disc, a tape, or a memory. Because the media player in the second specific example is analog, she will need to provide enough information to the interaction program 1000 so that the interaction program 1000, in operation with the program 1300, can identify the song. Using the mobile phone 90, the user navigates to the Company's Web site and interacts with the interaction program 1000. The interaction program 1000 solicits the unique identifier 1210, interprets it to obtain the user's user account code 480, and, in operation with user program 400, uses the code 480 to access the user's user record 440. It should be noted that if the user has not already been issued a unique identifier 1210, the interaction program 1000 at this point can, in operation with the financial program 600, step the user through a registration and payment process before the user proceeds to use the service. Or, the interaction program 1000 may allow the user to temporarily use the service on a trial basis. Once the user's unique identifier 1210 is recognized by the interaction program 1000, she is prompted to provide the time and venue information.

Although the time and venue information in this and other embodiments can serve as offline experience data items 260 as part of, for example, a media selection record 240, the time and venue information can serve individually and/or collectively in this embodiment as offline experience identifiers 280 in that the information can be used by the program 1300 to identify the media selection experienced by the user. For example, if the interaction program 1000 has access to the broadcast listings or the proposed program of the specific venue, and/or has monitored (or has access to information collected by an entity that has monitored) the broadcasts of the venue or the events at the venue, the interaction program 1000 can identify the media selection without requiring the user to provide any information other than the time and venue of the user's experience. This information is likely to be available to the Company in its regular course of business as an entertainment company. For example, if the Company has access to a television or radio station's play list, or monitors the broadcast of the television or radio station, the Company will know the time at which each song or video was played. Or, for example, if the Company has access to a proposed program for a given concert, and/or has monitored the events at the concert, the Company will know the time at which an event was performed at the concert. Accordingly, in the second specific example, when the user provides to the interaction program 1000 the time and venue information for the desired media selection, the interaction program 1000, in operation with program 1300 and the data table 1310, identifies the media selection and marks it as a media selection that the user desires to purchase and have delivered to her. Here in the second specific example, interaction program 1000, operation with the program 1300 and the data table 1310, has access to the play list of the analog radio station, and therefore knows that a given song was played on that station at the time the user specified.

It should be understood that in some cases, the venue through which the media selection is being experienced makes the user aware of additional information about the media selection, such as, for example, the title of the media selection, the type of the media selection, and the names of persons associated with the media selection. This additional information can be provided by the user to the interaction program 1000 so that the interaction program 1000 can more easily identify the media selection. For example, the master of ceremonies at an event could announce any of these items of information to the user. Or, for example, a digital media player could present any of these items of information to the user. Or, for example, a radio station jockey could announce any of these items of information over the airwaves. Depending on the nature of the additional information, the interaction program 1000 may not need to use program 1300 as described above in order to identify the desired media selection.

In the same regard, certain digital media players may also be aware of additional information such as, for example, the title of the media selection, the type of the media selection, and the names of persons associated with the media selection, and could transmit to the interaction program 1000 such additional information instead of or in addition to the time and venue information.

Once the unique identifier 1210 has been received and has been used to obtain the offline experience identifiers 280, the offline experience identifiers 280 can be used to access the offline experience data items 260 so that the online experience can be tailored. In the second specific example, the online experience includes downloading a media selection, and the online experience is tailored by facilitating the downloading of the specific media selection that the user experienced during the offline experience.

Accordingly, once the interaction program 1000 has obtained the time and venue information, the interaction program 1000 in the second specific example begins the process of tailoring the online experience accordingly. As noted above, the interaction program 1000, in operation with program 1300 and data table 1310, uses the time and venue information to identify the desired media selection and, in operation with program 1200, schedules the downloading of a digital copy 1120 of the media selection to a location specified by the user such as, for example, the user's computer 60. In some embodiments such as, for example, when the user provides the time and venue information from the computer 60 to which the digital copy 1120 will be downloaded, the downloading can begin as soon as possible. In other embodiments, the user may leave the computer 60 on and networked to the Company's Web site for the purpose of receiving downloads as soon as they are available, so that the digital copies 1120 of the media selections are available as soon as possible after the user returns to the computer 60.

In the second specific example, where the user provides the time and venue information from a mobile device such as the mobile phone 90, the downloading can begin after the user has returned to her computer 60. Accordingly, when the user returns to her computer 60, she can enter into a second transaction in which the interaction program 1000 receives the unique identifier 1210. This second transaction is related to the online experience, because it facilitates the actual downloading of the desired digital copy 1120. During this second transaction, the user operates the computer 60 to interact with the interaction program 1000, which solicits her unique identifier 1210. She can provide the unique identifier 1210 by any suitable manner, including the manners described above.

After receiving the user's unique identifier, the interaction program 1000 in the second specific example, uses it, in operation with the user program 400, to access the user's user record 440 in the user database 420. As noted above, the user's user record 440 has been annotated to reflect that the downloading of a digital copy 1120 of the media selection has been scheduled for the user.

Because the interaction program 1000 previously obtained the time and venue information, and used that information, in operation with program 1300, to identify the media selection, and in operation with program 1200, has scheduled the downloading of a digital copy 1120 of the media selection, the online experience has been tailored by the interaction program 1000. The tailoring is completed in this regard when the interaction program 1000, after the recent receipt of the user's unique identifier 1210, in operation with program 1200, initiates the scheduled download. Once the download is complete, the user is able to conveniently experience the media selection using media players well known in the art. In some embodiments, where the Company wishes to charge for the downloading, the interaction program 1000 can, in operation with financial program 600, solicit and receive additional payment information from the user to receive payment for the download.

It should be understood that alternatively or in addition to downloading digital copies of media selections, it would be possible to enable downloading of other content, such as information packets or hyperlinks to online content sites, or to enable the delivery of such information to an email or other electronic account of the user, depending on the size of the item to be downloaded and/or sent. Of course, if the media selections are small enough, such delivery to email account and/or other types of electronic accounts, may be desirable as well.

It should also be understood that the online experience can be further tailored in other manners, such as the manners discussed above with regard to providing the ability for the user to purchase merchandise related to the media selection, and to view information related to the media selection. Such tailoring can be based on the offline experience or on one or more of the user data items that are stored in the user's user record 440. In some embodiments, the interaction program 1000, in operation with the financial program 600, and with the user's permission, can, upon receipt of the offline experience identifiers 280 (including, if applicable, the time and venue information), debit the user's credit card for the price of a compact disc containing the song, and the price for delivering the compact disc to the user, and subsequently have the compact disc mailed to the user or have a digital copy of the song automatically downloaded to the user's computer.

Unless stated to the contrary, any use of words such as "including", "containing", "comprising" and the like, means "including without limitation" and shall not be construed to limit any general statement that it follows to the specific or similar items or matters immediately following it. References to a "plurality" of things means at least two of the things.

Except where the context indicates to the contrary, all company and product names, as well as URL addresses, are intended to be fictitious and used herein for purposes of example only.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of using a unique identifier to integrate an offline experience of a user with an online experience of the user, comprising:
   generating a unique identifier based on both an offline experience identifier and a user identifier, the offline experience identifier being operable to access at least one offline experience data item which is relevant to the offline experience, the user identifier being operable to access at least one user data item which is relevant to the user;
   receiving the unique identifier during a transaction related to the online experience;
   using the unique identifier to obtain at least one of the offline experience identifier and the user identifier; and
   tailoring the online experience based on at least one offline experience data item and at least one user data item,
   wherein the unique identifier is a numerical result of a mathematical algorithm applied to the offline experience identifier and the user identifier.

2. The method of claim 1, wherein the unique identifier comprises at least one of a character string and a bar code.

3. The method of claim 1, wherein the transaction comprises at least one of:
   scanning at least a portion of a physical object, the portion being imprinted with the unique identifier;
   soliciting and accepting manual input of the unique identifier; and
   accessing the unique identifier from a storage medium.

4. The method of claim 1, wherein the user data item is selected from the group consisting payment information, contact information, demographic information, and preference information.

5. The method of claim 4, wherein the demographic data is selected from the group consisting of marital status, income level, occupation, number of children, number of relatives, a biological feature and a biological measurement.

6. The method of claim 1, wherein a tailored portion of the online experience is exclusive to the user.

7. The method of claim 1, wherein the tailoring of the online experience comprises at least one of:
   providing a link to a site offering content relevant to at least one of the offline experience and the user;
   facilitating the purchase of an item relevant to at least one of the offline experience and the user;
   providing a discount to the user;
   presenting an advertisement to the user;
   presenting an opportunity to the user; and
   digitally transmitting a media selection to the user.

8. The method of claim 7, wherein the media selection has been identified by the time at which the user experienced the media selection, the venue through which the user experienced the media selection, and information regarding a presentation order of at least one media selection presented through the venue.

9. The method of claim 8, wherein the user has identified the time and the venue.

10. The method of claim 1, wherein the offline experience is a media selection experienced by the user and the offline experience data item comprises at least one of a title of the media selection, a person associated with the media selection, a time at which the media selection was experienced by the user, and a venue through which the media selection was experienced by the user.

11. The method of claim 10, wherein the media selection is an audio selection that is heard by the user.

12. The method of claim 10, wherein the media selection is a video selection that is at least one of heard and seen by the user.

13. The method claim 1, wherein the offline experience is an event experienced by the user and the offline experience data item comprises at least one of a name of the event, a person associated with the event, a type of the event, a time of the event, and a place of the event.

14. The method of claim 13, wherein the event is at least one of a concert, a show, a presentation, a lecture, and a speech that is attended by the user.

15. A storage medium containing a software program capable of causing a system to execute actions in using a unique identifier to integrate an offline experience of a user with an online experience of the user, the actions comprising:
   generating a unique identifier based on an offline experience identifier and a user identifier, the offline experience identifier being usable to access at least one offline experience data item which is relevant to the offline experience, the user identifier being usable to access at least one user data item which is relevant to the user;

receiving a unique identifier during a transaction related to the online experience;

using the unique identifier to obtain at least one of the offline experience identifier and the user identifier, the offline experience identifier being usable to access at least one offline experience data item which is relevant to the offline experience, the user identifier being usable to access at least one user data item which is relevant to the user; and tailoring the online experience based on at least one offline experience data item and at least one user data item, wherein the unique identifier is a numerical result of a mathematical algorithm applied to the offline experience identifier and the user identifier.

16. The medium of claim 15, wherein the unique identifier comprises at least one of a character string and a bar code.

17. The medium of claim 15, wherein the transaction comprises at least one of:

scanning at least a portion of a physical object, the portion being imprinted with the unique identifier;

soliciting and accepting manual input of the unique identifier; and accessing the unique identifier from a storage medium.

18. The medium of claim 15, wherein the user data item is selected from the group consisting payment information, contact information, demographic information, and preference information.

19. The medium of claim 18, wherein the demographic data is selected from the group consisting of marital status, income level, occupation, number of children, number of relatives, a biological feature and a biological measurement.

20. The medium of claim 15, wherein a tailored portion of the online experience is exclusive to the user.

21. The medium of claim 15, wherein the tailoring of the online experience comprises at least one of:

providing a link to a site offering content relevant to at least one of the offline experience and the user;

facilitating the purchase of an item relevant to at least one of the offline experience and the user;

providing a discount to the user;

presenting an advertisement to the user;

presenting an opportunity to the user; and digitally transmitting a media selection to the user.

22. The medium of claim 21, wherein the media selection has been identified by the time at which the user experienced the media selection, the venue through which the user experienced the media selection, and information regarding a presentation order of at least one media selection presented through the venue.

23. The medium of claim 22, wherein the user has identified the time and the venue.

24. The medium of claim 15, wherein the offline experience is a media selection experienced by the user and the offline experience data item comprises at least one of a title of the media selection, a person associated with the media selection, a time at which the media selection was experienced by the user, and a venue through which the media selection was experienced by the user.

25. The medium of claim 24, wherein the media selection is an audio selection that is heard by the user.

26. The medium of claim 24, wherein the media selection is a video selection that is at least one of heard and seen by the user.

27. The medium claim 15, wherein the offline experience is an event experienced by the user and the offline experience data item comprises at least one of a name of the event, a person associated with the event, a type of the event, a time of the event, and a place of the event.

28. The medium of claim 27, wherein the event is at least one of a concert, a show, a presentation, a lecture, and a speech that is attended by the user.

29. A system including a microprocessor operating under the control of at least one software program capable of causing the system to execute actions in using a unique identifier to integrate an offline experience of a user with an online experience of the user, the actions comprising:

generating a unique identifier based on an offline experience identifier and a user identifier, the offline experience identifier being usable to access at least one offline experience data item which is relevant to the offline experience, the user identifier being usable to access at least one user data item which is relevant to the user;

receiving the unique identifier during a transaction related to the online experience;

using the unique identifier to obtain at least one of the offline experience identifier and the user identifier; and tailoring the online experience based on at least one offline experience data item and at least one user data item, wherein the unique identifier is a numerical result of a mathematical algorithm applied to the offline experience identifier and the user identifier.

30. The system of claim 29, wherein the unique identifier comprises at least one of a character string and a bar code.

31. The system of claim 29, wherein the transaction comprises at least one of:

scanning at least a portion of a physical object, the portion being imprinted with the unique identifier;

soliciting and accepting manual input of the unique identifier; and accessing the unique identifier from a storage medium.

32. The system of claim 29, wherein the user data item is selected from the group consisting payment information, contact information, demographic information, and preference information.

33. The system of claim 32, wherein the demographic data is selected from the group consisting of marital status, income level, occupation, number of children, number of relatives, a biological feature and a biological measurement.

34. The system of claim 29, wherein a tailored portion of the online experience is exclusive to the user.

35. The system of claim 29, wherein the tailoring of the online experience comprises at least one of:

providing a link to a site offering content relevant to at least one of the offline experience and the user;

facilitating the purchase of an item relevant to at least one of the offline experience and the user;

providing a discount to the user;

presenting an advertisement to the user;

presenting an opportunity to the user; and digitally transmitting a media selection to the user.

36. The system of claim 35, wherein the media selection has been identified by the time at which the user experienced the media selection, the venue through which the user experienced the media selection, and information regarding a presentation order of at least one media selection presented through the venue.

37. The system of claim 36, wherein the user has identified the time and the venue.

38. The system of claim 29, wherein the offline experience is a media selection experienced by the user and the offline experience data item comprises at least one of a title of the media selection, a person associated with the media selection, a time at which the media selection was experienced by the user, and a venue through which the media selection was experienced by the user.

39. The system of claim 38, wherein the media selection is an audio selection that is heard by the user.

40. The system of claim 38, wherein the media selection is a video selection that is at least one of heard and seen by the user.

41. The system claim 39, wherein the offline experience is an event experienced by the user and the offline experience data item comprises at least one of a name of the event, a person associated with the event, a type of the event, a time of the event, and a place of the event.

42. The system of claim 41, wherein the event is at least one of a concert, a show, a presentation, a lecture, and a speech that is attended by the user.

43. A system capable of using a unique identifier to integrate an offline experience of a user with an online experience of a user, comprising:
means for generating a unique identifier based on an offline experience identifier and a user identifier, the offline experience identifier being usable to access at least one offline experience data item which is relevant to the offline experience, the user identifier being usable to access at least one user data item which is relevant to the user;
means for receiving a unique identifier during a transaction related to the online experience;
means for using the unique identifier to obtain at least one of an offline experience identifier and a user identifier; and
means for tailoring the online experience based on at least one offline experience data item and at least one user data item,
wherein the unique identifier is a numerical result of a mathematical algorithm applied to the offline experience identifier and the user identifier.

44. The system of claim 43, wherein the unique identifier comprises at least one of a character string and a bar code.

45. The system of claim 43, wherein the transaction comprises at least one of:
scanning at least a portion of a physical object, the portion being imprinted with the unique identifier;
soliciting and accepting manual input of the unique identifier; and
accessing the unique identifier from a storage medium.

46. The system of claim 43, wherein the user data item is selected from the group consisting payment information, contact information, demographic information, and preference information.

47. The system of claim 46, wherein the demographic data is selected from the group consisting of marital status, income level, occupation, number of children, number of relatives, a biological feature and a biological measurement.

48. The system of claim 43, wherein a tailored portion of the online experience is exclusive to the user.

49. The system of claim 43, wherein the tailoring of the online experience comprises at least one of:
providing a link to a site offering content relevant to at least one of the offline experience and the user;
facilitating the purchase of an item relevant to at least one of the offline experience and the user;
providing a discount to the user;
presenting an advertisement to the user;
presenting an opportunity to the user; and
digitally transmitting a media selection to the user.

50. The system of claim 49, wherein the media selection has been identified by the time at which the user experienced the media selection, the venue through which the user experienced the media selection, and information regarding a presentation order of at least one media selection presented through the venue.

51. The system of claim 50, wherein the user has identified the time and the venue.

52. The system of claim 50, wherein the offline experience is a media selection experienced by the user and the offline experience data item comprises at least one of a title of the media selection, a person associated with the media selection, a time at which the media selection was experienced by the user, and a venue through which the media selection was experienced by the user.

53. The system of claim 52, wherein the media selection is an audio selection that is heard by the user.

54. The system of claim 52, wherein the media selection is a video selection that is at least one of heard and seen by the user.

55. The system claim 43, wherein the offline experience is an event experienced by the user and the offline experience data item comprises at least one of a name of the event, a person associated with the event, a type of the event, a time of the event, and a place of the event.

56. The system of claim 55, wherein the event is at least one of a concert, a show, a presentation, a lecture, and a speech that is attended by the user.

57. A method of using a unique identifier to integrate an offline experience of a user with an online experience of the user, comprising:
generating a unique identifier based on an offline experience identifier and a user identifier,
receiving the unique identifier during a transaction related to the online experience;
using the unique identifier to obtain at least one of the offline experience identifier and the user identifier, the offline experience identifier being usable to access at least one offline experience data item which is relevant to the offline experience, the user identifier being usable to access at least one user data item which is relevant to the user;
tailoring the online experience based on at least one offline experience data item and at least one user data item;
prompting the user to enter time and venue information associated with when and where a media broadcast was transmitted; and
accessing a list of previous media broadcasts of the entered venue by the entered time and identifying a media selection associated with the time,
wherein the unique identifier is a numerical result of a mathematical algorithm applied to the offline experience identifier and the user identifier.

58. The system method of claim 43 further comprising:
means for prompting the user to enter time and venue information associated with when and where a media broadcast was transmitted; and
means for accessing a list of previous broadcasts of the entered venue by the entered time and for identifying a media selection associated with the entered time.

* * * * *

UNITED STATES PATENT AND TRADEMARK OFFICE
CERTIFICATE OF CORRECTION

PATENT NO. : 7,376,592 B2
APPLICATION NO. : 10/205760
DATED : May 20, 2008
INVENTOR(S) : Julian David Waldman Page 1 of 1

It is certified that error appears in the above-identified patent and that said Letters Patent is hereby corrected as shown below:

Column 26, line 13, "50" should read -- 43 --

Signed and Sealed this

Twentieth Day of October, 2009

David J. Kappos
*Director of the United States Patent and Trademark Office*